United States Patent [19]
Brunk et al.

[11] Patent Number: 5,272,614
[45] Date of Patent: Dec. 21, 1993

[54] MICROPROCESSOR-CONTROLLED DC-DC CONVERTER

[75] Inventors: Manfred Brunk, Erlangen/Spardorf; Günther Chluba, Nürnberg; Karl-Heinz Düssel, Roth, all of Fed. Rep. of Germany

[73] Assignee: U.S. Philips Corporation, New York, N.Y.

[21] Appl. No.: 908,139

[22] Filed: Jul. 2, 1992

[30] Foreign Application Priority Data

Jul. 11, 1991 [DE] Fed. Rep. of Germany ....... 4122945

[51] Int. Cl.$^5$ .......................................... H02M 3/335
[52] U.S. Cl. ........................................ 363/21; 323/283
[58] Field of Search ............................ 363/21; 323/283

[56] References Cited

U.S. PATENT DOCUMENTS 4,128,771 12/1978 Domenico .............................. 307/52
4,562,548 12/1985 Andersen et al. ................... 364/483

FOREIGN PATENT DOCUMENTS 463892 1/1992 European Pat. Off. .
2-55573 2/1990 Japan .
4-87556 3/1992 Japan .
2030736 4/1980 United Kingdom .

OTHER PUBLICATIONS

Search Report (EPO).

Primary Examiner—William H. Beha, Jr.
Attorney, Agent, or Firm—Bernard Franzblau

[57] ABSTRACT

A microprocessor-controlled DC-DC converter includes a controllable switch for generating at least one output voltage (Ua). The duty cycle of the controllable switch is controllable depending upon the output voltage. Despite the use of an inexpensive and hence "slow" microprocessor, the control stability of the DC-DC converter will still be adequate if, during the computation time of the microprocessor that is available for the calculation of the duty cycle of the controllable switch, the output voltage is sampled more than once. The duty cycle of the controllable switch is presettable as discrete values (Df) determined by means of an output unit of the microprocessor. These discrete values are formed, from the respective duty cycle determined, by a coarse quantization which corresponds to the temporal resolution of the microprocessor and by a fine quantization associated with each quantization step of the coarse quantization.

16 Claims, 2 Drawing Sheets

MICROPROCESSOR-CONTROLLED DC-DC CONVERTER

BACKGROUND OF THE INVENTION

This invention relates to a DC-DC converter, comprising a controllable switch for producing at least one output voltage, the duty cycle of the controllable switch being controllable by means of a microprocessor.

The powering of electronic apparatus requires the use of DC-DC converters which supply one or more output voltages. DC-DC converters comprising a controllable switch are clocked DC-DC converters, among which notably flyback converters and forward converters can be distinguished as basic types. Therein, an input DC voltage is converted, using the controllable switch, into a squarewave voltage which is rectified and filtered. The controllable switch can operate, for example, at frequencies of between 50 kHz and 200 kHz. The controllable switch is controlled by pulses whose respective width, characterizing the duty cycle, is modulated in dependence on load fluctuations of the output voltage. The pulses are generated by a control circuit, for example a pulse width modulator and are applied to the control electrode of the controllable switch. The duty cycle is then usually varied at a constant switching frequency of the controllable switch.

GB-A-2 030 736 proposes to control the duty cycle of the controllable switch in a DC-DC converter of the kind set forth by means of a microprocessor. Therein, quantized values which determine the duty cycle are applied to a driver stage which drives the controllable switch. In order to avoid instabilities in the control of the DC-DC converter, a comparatively fast and hence expensive microprocessor must be used.

SUMMARY OF THE INVENTION

It is an object of the invention to provide a DC-DC converter of the kind set forth in which control stability is ensured even when a less expensive microprocessor is used.

In a DC-DC converter of the kind set forth this object is achieved in that the computation time required by the microprocessor for determining the relevant duty cycle is greater than one period of the switching frequency of the controllable switch, at least one output variable of the DC-DC converter being sampled at least once during said computation time of the microprocessor, it being possible to preset discrete values for the duty cycle of the controllable switch. The discrete values are formed, from the relevant duty cycle determined, by a coarse quantization which corresponds to the temporal resolution of the microprocessor and by a fine quantization which can be associated with each quantization step of the coarse quantization. The sampled output variable may be the output voltage, the output current and/or another variable.

The invention is based on the recognition of the fact that in order to achieve a small volume of the DC-DC converter, the controllable switch should operate at switching frequencies of, for example 50 kHz. However, when a less expensive microprocessor is used, the computation time required by the microprocessor for determining the relevant duty cycle is too long in the presence of such a high switching frequency. Therefore, the computation of the relevant duty cycle by means of the microprocessor always requires more than one period of the switching frequency of the controllable switch, so that sub-sampling occurs.

When the computation time required for computing the duty cycle of the controllable switch amounts to, for example, four periods of the switching frequency, sub-sampling by a factor four must be chosen, i.e. a new duty cycle is determined every four periods of the switching frequency and the controllable switch is controlled accordingly. It is thus possible to use a "slow", commercially available and hence economical microprocessor. During the computation time available for computing the duty cycle of the controllable switch, for example the output voltage is advantageously sampled more than once. For example, the output voltage can be sampled during the first and during the third period of the computation time required for computing the duty cycle. As a result, for the determination of the duty cycle each time an updated value of the output voltage is available, thus making a first contribution to improved control stability for the DC-DC converter. If further computation time of the microprocessor is available because of the sub-sampling, during a remaining period the output current or other signals characterizing the DC-DC converter can be sampled. When the relevant duty cycle of the drive pulses for the controllable switch is governed by way of a microprocessor timer, the temporal resolution of the duty cycle values to be formed is predetermined by the temporal resolution of the microprocessor timer. As a result, quantization takes place which also leads to stability problems. Therefore, first a coarse quantization in conformity with the temporal resolution of the microprocessor timer is performed and subsequently a fine quantization in that each quantization step of the coarse quantization is subdivided into a number of segments which depends on the sub-sampling factor, each of said segments being associated with respective fine quantization steps. This fine quantization makes it possible to realize, instead of a static output of the duty cycle of the controllable switch on the basis of a sub-sampling by the factor 4 of, for example four periods, i.e. the duty cycle is maintained constant for four periods, a dynamic output which is predetermined in accordance with the fine quantization. For example, when a quantization step is subdivided into four segments as a consequence of sub-sampling by a factor 4, a finely quantized value for the duty cycle can be output to the controllable switch at the temporal centre of the four periods. For example, if only ten coarsely quantized values of the duty cycle are feasible on the basis of the coarse quantization, the fine quantization then produces 40 finely quantized values. As a result, any stability problems occurring due to the sub-sampling are compensated for to a high degree, thus enabling stable control of the DC-DC converter despite the use of a comparatively "slow" microprocessor.

In one embodiment, the microprocessor forms a difference signal between at least one signal which can be derived notably from the output voltage and/or the output current of the DC-DC converter and at least one reference value to be stored in a memory of the microprocessor, the duty cycle being determined from said difference signal by means of a digital filter comprising a control transfer function, notably of the PIT1 type. The output voltage, the output current as well as further variables of the DC-DC converter to be monitored are applied to the microprocessor via a multiplexer which is included in the microprocessor, after which they are converted into a respective digital signal by means of an analog-to-digital converter, which digital signal is compared as the actual value with the digital reference value stored in the microprocessor. The difference signal thus obtained forms the input signal for the digital filter. The digital filter forms a PIT1-type controller with disturbance variable feedforward. The output signal of the digital filter is applied to the internal pulse width modulator which is formed by the means for the coarse quantization and the fine quantization and which adjusts the duty cycle of the controllable switch for supply in known manner, via a driver, to the control electrode of the controllable switch.

In a further embodiment, the switching frequency and the duty cycle are produced by means of a microprocessor timer. For generating the switching frequency, the timer then operates in the so-called auto-reload mode. In that case the timer does not count from zero, but is incremented from a value each time loaded. This loaded value determines the switching frequency of the controllable switch. The duty cycle is produced, for example by means of a compare function of the microprocessor.

In one embodiment fine quantization is realized by means of a table whereby the quantization steps of the coarse quantization can be assigned to the values of the fine quantization. For each period of the sub-sampling each time differently encoded table segments can be used, so that the fine quantization can be very simply realized.

BRIEF DESCRIPTION OF THE DRAWING

Embodiments in accordance with the invention will be described in detail hereinafter with reference to the accompanying drawings.

Therein.

DESCRIPTION OF THE PREFERRED EMBODIMENTS

Figure 1:
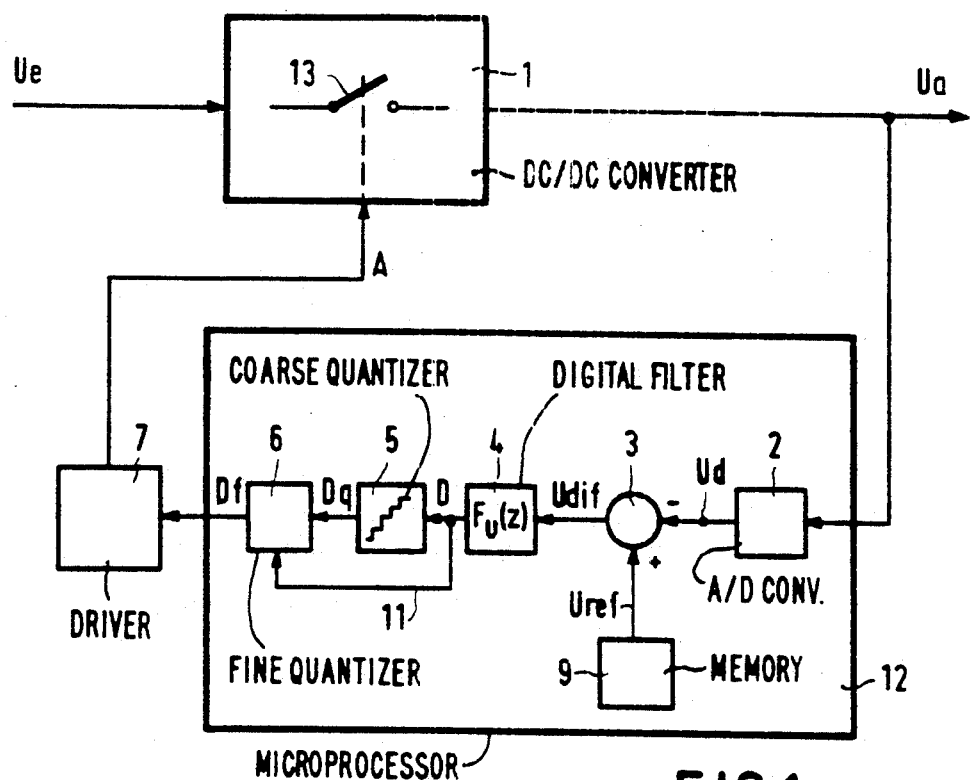
FIG. 1 shows the block diagram of a DC-DC converter.

The DC-DC converter 1 shown in FIG. 1 is powered by an input voltage Ue. The DC-DC converter 1 comprises a controllable switch 13 which is controlled by a control signal A from a driver stage 7. The output of the DC-DC converter 1, being constructed, for example, as a flyback or a forward converter, carries an output voltage Ua. The output voltage Ua is controlled by means of a microprocessor 12 which generates a control signal Df for the driver stage 7 in dependence on the output voltage Ua, which control signal characterizes the duty cycle of the controllable switch. For the sake of clarity, FIG. 1 shows separate blocks for the individual operations to be performed by the processor 12, said blocks being executed essentially by way of software by the microprocessor 12. To this end, the microprocessor 12 receives the output voltage Ua which is first converted into a digital signal Ud by means of an analog-to-digital converter 2. The values of the digital signal Ud are compared with a reference value Uref, stored in a memory 9 of the microprocessor 12, by means of an adder 3. The difference value Udif thus determined on the output of the adder is applied to a digital filter 4 having a PIT1-type control transfer function $F_u(z)$. The values D determined by the digital filter 4 and characterizing the duty cycle of the controllable switch 13 are quantized by means of an output unit 5, 6. The values D are first coarsely quantized to values Dq by way of a coarse quantization 5, and subsequently finely quantized to the values Df by means of a fine quantization 6.

In the embodiment shown in FIG. 1, first the analog output voltage Ua is converted into the digital control variable of the digital value Ud in the microprocessor 12, using the analog-to-digital converter 2. Via adder 3, this value is compared with the reference value Uref which is stored in the memory 9 and which has been programmed in advance. The difference value Udif on the output of the adder 3 represents a measurement variable for the errors in the output voltage Ua. Using software, the digital filter 4 simulates the behaviour of an analog loop filter and has a PIT1-type behaviour. The coefficients which are dependent on the gain and which thus determine the behaviour of the digital filter are chosen so that the digital filter 4 exhibits a high gain in combination with a suitable attenuation. Thus, a compromise is ensured between speed and control response of the DC-DC voltage converter. Moreover, the digital filter 4 exhibits suitable equalization, notably of the P component of its static control characteristic. Such equalization is necessary because the following errors occur due to the digitization: quantization errors due to the analog/digital conversion ($+ - \frac{1}{2}$ stage), hardware-induced errors, and errors induced by internal computations or normalizations of the difference equations to be realized. For example, because of the limited word length of the microprocessor, intermediate results must be cut off. The loss of information induced by said errors leads to an erroneous preset of the duty cycle of the controllable switch. As a result, the static quantization characteristic of the digital filter is more or less uniform. Using equalization, i.e. suitably chosen coefficients for the proportioning of the controller, an as uniform as possible controller characteristic can be adjusted.

Several criteria are to be considered for the selection of the microprocessor which serves mainly to execute the control. The microprocessor should be as inexpensive as possible so that it can be economically employed in comparison with analog control systems. The computation time of the microprocessor 12 required for determining the relevant duty cycle D is then greater than one period of the switching frequency of the controllable switch 13. For example, when the Siemens microprocessor SAB 80C535 is used for computing the duty cycle D, four periods of the switching frequency of the controllable switch 13 are required. This leads to sub-sampling of the output voltage Ua, which itself gives rise to stability problems in the control circuit. This drawback of sub-sampling can be compensated for firstly by sampling the output voltage Ua more than once during the computation time of the microprocessor 12 available for computing the duty cycle D of the controllable switch 13. This will be described in detail hereinafter on the basis of an example.

In the case of a switching frequency of 50 kHz, corresponding to a period duration of 20 μs and sub-sampling by the factor 4, i.e. the computing time required for computing the duty cycle D of the controllable switch 13 amounts to 4 periods of the switching frequency of the controllable switch, four periods or 80 μs are thus available for a complete computing cycle. For analog-to-digital conversion each time 15 μs are required. It is thus possible to sample the output voltage twice, for example during the first and the third period. It is thus achieved that the voltage values Ua used for computing new value D for the duty cycle have been delayed by a at the most five periods at the end of every fourth period because the computation of a new duty cycle each time requires three sampled values of the output voltage. This will be described in more detail with reference to FIG. 3. Thus, a "stepped" sub-sampling of the output voltage Ua takes place. During the second period, moreover, for example the output current of the DC-DC converter 1 can be sampled and during the fourth period, for example, a further variable characterizing the DC-DC converter 1 can be sampled for monitoring purposes.

The duty cycle determined by the output unit 5, 6 of the embodiment shown in FIG. 1 can be preset only in the form of discrete values Df which are formed, from the duty cycle D each time determined, by a coarse quantization 5 and a subsequent fine quantization 6. The coarse quantization 5 is defined by the temporal resolution of the microprocessor timer. It is thus in principle defined by hardware. Such a coarsely quantized preset of the duty cycle, however, can lead, in conjunction with the sub-sampling, to stability problems in the control circuit realised by the microprocessor 12. For example, in the cited microprocessor SAB 80C535, having a temporal resolution of the duty cycle which amounts to 1 μs and a switching period of 20 μs, only ten quantized values Dq can be realised for the duty cycle. This drawback can be substantially compensated for by the fine quantization succeeding the coarse quantization 5. To this end, instead of simply outputting the coarsely quantized value Dq of the duty cycle D constantly via the number of periods of the clock frequency of the controllable switch 13, corresponding to the sub-sampling, the value Dq is varied in time within these periods in dependence on the calculated value D of the duty cycle. The connection 11 in FIG. 1, indicating that the values D of the duty cycle as well as the coarsely quantized values Dq are applied to the fine quantization device 6, illustrates this process. For fine quantization, each quantization step of the coarse quantization device 5 is sub-divided into segments which are dependent on the sub-sampling factor, each of said segments being assigned to the respective fine quantization steps determining the finely quantized duty cycle Df of the controllable switch. Fine quantization 6 can be realized, for example by means of a table whereby the quantization steps of the coarse quantization can be assigned to the values of the fine quantization 6. The fine quantization 6 is illustrated with reference to FIG. 2. The effect of this fine quantization is as if a finer temporal resolution of the pulse width modulator formed by the output unit 5, 6, i.e. of the microprocessor timer, could be achieved. As result, the behaviour of the control circuit is substantially more stable and less critical. Moreover, the amplitudes of sub-harmonics of the clock frequency of the controllable switch, occurring notably because of the sub-sampling, are substantially reduced. The variation of the duty cycle of the controllable switch is performed on the basis of the fine quantization by the output unit 5, 6. This does not take place only after the number of periods of the switching frequency of the controllable switch as predetermined by the sub-sampling, but in the manner to be described with reference to FIGS. 3a to 3d. The decisive aspect of the fine quantization in conjunction with the sub-sampling is that in this manner less severe requirements need be imposed as regards the speed of the microprocessor in comparison with the case of absence of a microprocessor, and hence real-time control.

The dynamics of the control circuit are improved and the stability of the control circuit is ensured by the combined effect of the use of an inexpensive microprocessor for controlling a DC-DC converter, the stepped sub-sampling as well as the fine quantization. The use of the microprocessor is also attractive because of the additional advantages of programmable monitoring and signalling by means of the microprocessor. Moreover, the construction of DC-DC converters using microprocessors can be simplified and standardized by way of flexible, readily adaptable software.

Figure 2:
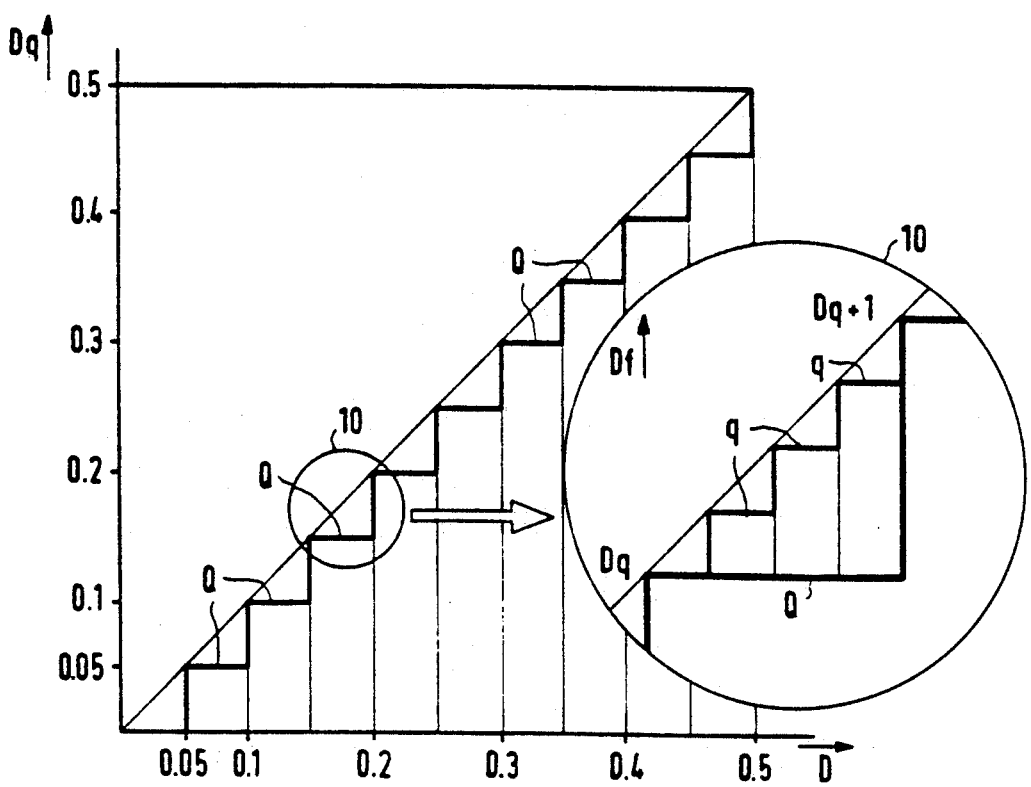
FIG. 2 shows a diagram illustrating the fine quantization.

The diagram of FIG. 2 shows the coarsely quantized values Dq of the duty cycle in dependence on the calculated values D of the duty cycle. As has already been demonstrated with reference to FIG. 1, a quantization characteristic comprising quantization steps Q is then obtained on the basis of the microprocessor hardware. The temporal resolution amounts to 1 μs in the Siemens microprocessor SAB 80C535, so that for a switching period amounting to 20 μs the value 0.05 is obtained for the quantization of the pulse duty factor. Therefrom, the ten feasible quantization steps Q arise as a function of the duty cycle D determined. In order to illustrate the fine quantization, FIG. 2 shows an arbitrary step in a section 10 which is represented at an enlarged scale. The enlarged section 10 shows the fine quantization steps q of the finely quantized values Df of the duty cycle. A quantization step Q is subdivided into four equally large segments. Depending on the value D of the duty cycle determined, instead of a static value Dq, the fine quantization produces the following values in the first segment of the quantization step Q:

In the first segment: four times Dq

In the second segment: three times Dq and once Dq+1

In the third segment: twice Dq and twice Dq+1

In the fourth segment: once Dq and three times Dq+1

When the temporal mean value is determined for each of the four possible combinations over four periods, three additional intermediate values are obtained between Dq and Dq+1, i.e. the fine quantization ultimately produces 40 values from the initially Q=10 quantized values Dq of the duty cycle. This fine quantization enables stabilization of the closed control circuit, an additional advantage being obtained in that the components of a sub-harmonic of the clock frequency of 50 kHz, caused by the sub-sampling by the factor 4, are reduced in the output voltage spectrum at a quarter of this clock frequency, being equal to 12.5 kHz.

Figure 3:
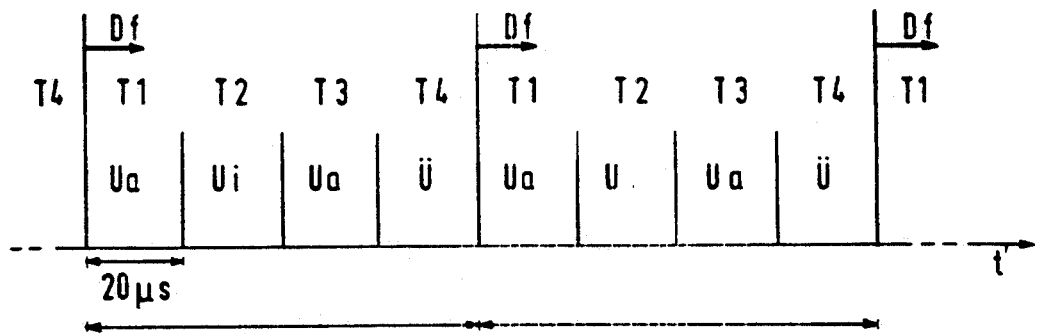
FIG. 3 shows a diagram illustrating the sub-sampling.

FIG. 3 shows a time diagram illustrating the sub-sampling. On the time axis there are plotted two time slots R required for determination of the relevant duty cycle D by the microprocessor. This will again be illustrated on the basis of the example of the microprocessor SAB 80C535 and sub-sampling by the factor 4. As has already been stated, for the computation of the relevant duty cycle Df, each time four periods of the frequency of the controllable switch (FIG. 1) are required. At the end of every fourth period, the finely quantized value Df of the duty cycle is output. This is denoted in FIG. 3 by an arrow at the end of every fourth period T4 of the computing time R. The stepped sub-sampling already described with reference to FIG. 1 thus takes place as follows. During a first period T1 as well as during a third period T3, the output voltage Ua of the DC-DC converter is sampled. During a second period T2, a voltage Ui characterizing the output current of the DC-DC converter can be sampled, and during a fourth period T4 a further variable U characterizing the DC-DC converter can be sampled for monitoring purposes. It is thus achieved that the voltage values Ua used are available each time as current values for the computation of a new duty cycle D, so that the stability of the control circuit of the DC-DC converter is improved. In conjunction with the fine quantization already described with reference to FIGS. 1 and 2, such stepped sub-sampling results in improved controller dynamics as well as a high control circuit stability.

Figure 3A:
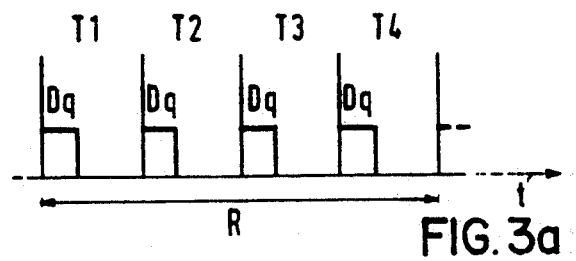
FIGS. 3a to 3d show diagrams illustrating the fine quantization.
Figure 3B:
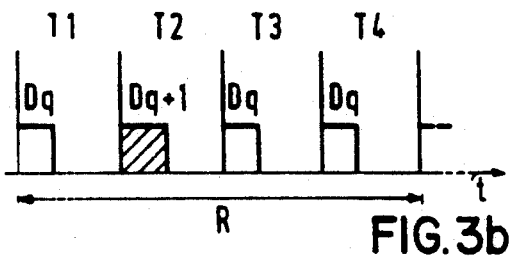
Figure 3C:
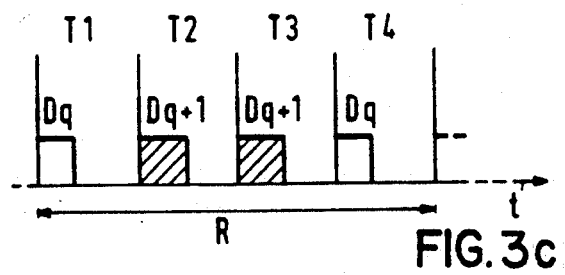
Figure 3D:
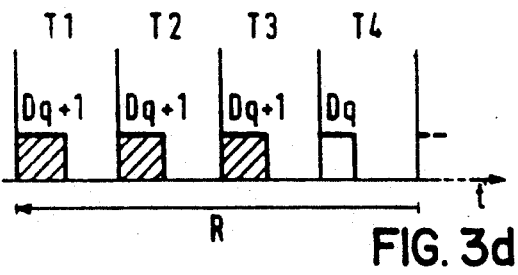

FIGS. 3a to 3d show four diagrams illustrating four values of the duty cycle quantized in conformity with the example shown in FIG. 2. Therein, a time slot R is each time plotted on the time axis, which time slot is each time required for determination of the respective duty cycle D by the microprocessor. FIG. 3a shows that when the value of the duty cycle D determined is situated in the first segment of a quantization step Q (FIG. 2), a coarsely quantized value Dq of the duty cycle is output in all four periods T1, T2, T3, T4 of a time slot R. FIG. 3b shows that when the calculated value D of the duty cycle is situated in the second quarter, i.e. in the second segment of a coarse quantization step Q, the lower coarse quantization step Dq is output in three periods T1, T3, T4, the value Dq+1 being output during the second period T2. As a result, at the temporal mean instant a finely quantized value of the duty cycle Df, being associated in FIG. 2 with the fine quantization step q associated with the second segment of the quantization step Q, is output. FIG. 3c illustrates the case where the duty cycle D determined is situated in the third quarter of a coarse quantization step Q. In this case the each time greater coarse quantization step Dq+1 is output in two periods of the computation time R, the lower coarse quantization step Dq being output in two periods T1, T4. As a result, at the temporal mean instant a fine quantization of the duty cycle Df arises which corresponds to an intermediate value between the quantization steps Dq and Dq+1. Finally, FIG. 3d shows that the value D of the duty cycle determined is situated in the fourth quarter of the coarse quantization step Q. In this case the value Dq+1 is output three times and the lower coarse quantization value Dq is output only during the period T4. The fine quantization steps q described with reference to FIG. 2 can thus be represented. The sequence of the assignment of the values Dq and Dq+1 to the relevant four periods T1 . . . T4 is then arbitrary.

Figure 4:
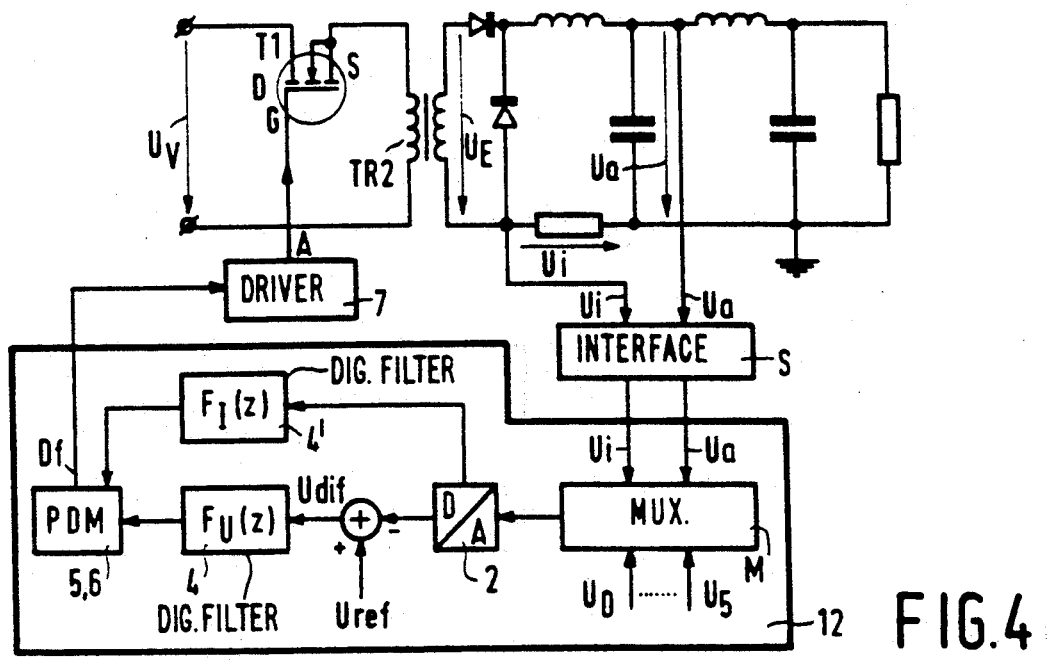
FIG. 4 shows an embodiment of a digitally controlled DC-DC converter.

FIG. 4 shows a further embodiment of a microprocessor-controlled DC-DC converter. Therein, use is made of a DC-DC converter which operates according to the forward converter principle. This is described, for example in "Schaltnetzteile-Grundlagen, Schaltungsbeispiele" by Joachim Wüstehube. Therein, a DC voltage Uv is converted into a squarewave voltage by means of a controllable switch which is constructed as a field effect transistor T1, said squarewave voltage being transformed by means of a transformer Tr2. At the secondary side a DC conversion takes place by means of the forward converter, followed by LC filtering. The output voltage Ua is stabilized by means of a microprocessor 12 which is driven via an interface S and which influences the duty cycle of the controllable switch T1 by extraction of the output voltage Ua as the first control variable as well as by a second control variable Ui which characterizes the output current. The analog control variables Ua and Ui are applied, via a multiplexer, to an analog-to-digital converter 2. The multiplexer M may also receive further signals U0 to U5 for monitoring the DC converter. After digitalization, the first control variable Ua is compared with a reference voltage Uref and the difference is subsequently processed in a PIT1-type digital filter 4. The second control variable Ui is also digitized and applied to a second digital filter 4' having a P-type transfer function (disturbance variable feedforward). The results of both control operations are converted, in the pulse duration modulator 5, 6, into the pulse duty cycle or the duty cycle Df of the controllable switch T1 and applied, via a driver 7, to the gate electrode of the controllable switch T1. The driver 7 ensures inversion, if necessary, of the signal supplied by the pulse duration modulator 5, 6 and also provides amplification. Using the multiplexer M already present in the microprocessor 12, in addition to the output voltage and the output current, further variables characterizing the behaviour of the DC-DC converter can be monitored and used, if desired, for signalling. In comparison with analog control circuit, the latter can be realized in a simple manner.

We claim:

1. A DC-DC converter comprising: a controllable switch producing at least one output voltage (Ua), the duty cycle (D) of the controllable switch being controllable by means of a microprocessor, characterized in that the computation time required by the microprocessor for determining the relevant duty cycle (D) is greater than one period of the switching frequency of the controllable switch, at least one output variable of the DC-DC converter being sampled at least once during said computation time (R) of the microprocessor, preset discrete values (Df) for the duty cycle (D) of the controllable switch being formed from the relevant duty cycle (D) determined by a coarse quantization which corresponds to the temporal resolution of the microprocessor and by a fine quantization associated with each quantization step of the coarse quantization.

2. A DC-DC converter as claimed in claim 1, wherein the output voltage (Ua), the output current (Ui) and further signals (U0 . . . U5) to be monitored are applied to the microprocessor via a multiplexer of the microprocessor.

3. A DC-DC converter as claimed in claim 2, wherein the microprocessor is capable of sampling at least one signal (U0 . . . U5) to be monitored, and during the computation time (R) not required for the determination of the duty cycle (D).

4. A DC-DC converter as claimed in claim 2, wherein for the fine quantization each quantization step (Q) is subdivided into predetermined segments to each of which are assigned respective fine quantization steps (q) which respectively determine a duty cycle (Df) of the controllable switch which, averaged in time, is finely quantized.

5. A DC-DC converter as claimed in claim 1 for the fine quantization each quantization step (Q) is subdivided into predetermined segments to each of which are assigned respective fine quantization steps (q) which respectively determine a duty cycle (Df) of the controllable switch which, averaged in time, is finely quantized.

6. A DC-DC converter as claimed in claim 5, wherein the switching frequency and the duty cycle are generated by means of a timer of the microprocessor.

7. A DC-DC converter as claimed in claim 5, wherein the fine quantization is performed by means of a table whereby the values of the fine quantization can be assigned to the quantization steps (Q) of the coarse quantization.

8. A DC-DC converter as claimed in claim 5, wherein the microprocessor is capable of sampling at least one signal (U0 ... U5) to be monitored, and during the computation time (R) not required for the determination of the duty cycle (D).

9. A DC-DC converter as claimed in claim 5, wherein an output unit supplies the controllable switch with the finely quantized values (Df) of the duty cycle in the rhythm of the switching frequency.

10. A DC-DC converter as claimed in claim 1, wherein the fine quantization is performed by means of a table whereby the values of the fine quantization can be assigned to the quantization steps (Q) of the coarse quantization.

11. A DC-DC converter as claimed in claim 10, wherein the microprocessor is capable of sampling at least one signal (U0 ... U5) to be monitored, and during the computation time (R) not required for the determination of the duty cycle (D).

12. A DC-DC converter as claimed in claim 10, wherein the output unit (5, 6) supplies the controllable switch with the finely quantized values (Df) of the duty cycle in the rhythm of the switching frequency.

13. A DC-DC converter as claimed in claim 1, wherein an output unit supplies the controllable switch with the finely quantized values (Df) of the duty cycle in the rhythm of the switching frequency.

14. A DC-DC converter as claimed in claim 1, wherein the switching frequency and the duty cycle are generated by means of a timer of the microprocessor.

15. A DC-DC converter as claimed in claim 14, wherein the fine quantization is performed by means of a table whereby the values of the fine quantization can be assigned to the quantization steps (Q) of the coarse quantization.

16. A DC-DC converter as claimed in claim 1, wherein the microprocessor is capable of sampling at least one signal (U0 ... U5) to be monitored, and during the computation time (R) not required for the determination of the duty cycle (D).

* * * * *